US006209710B1

(12) United States Patent
Mueller et al.

(10) Patent No.: US 6,209,710 B1
(45) Date of Patent: Apr. 3, 2001

(54) METHOD FOR THE SUSPENDED CONVEYING OF CONTAINERS AND DEVICE FOR CARRYING OUT SAID METHOD

(75) Inventors: Thomas Mueller; Ernst Kuenzler, both of Weinfelden (CH)

(73) Assignee: IPT Weinfelden AG, Weinfelden (CH)

( * ) Notice: Subject to any disclaimer, the term of this patent is extended or adjusted under 35 U.S.C. 154(b) by 0 days.

(21) Appl. No.: 09/180,669

(22) PCT Filed: May 9, 1997

(86) PCT No.: PCT/CH97/00180

§ 371 Date: Feb. 16, 1999

§ 102(e) Date: Feb. 16, 1999

(87) PCT Pub. No.: WO97/43197

PCT Pub. Date: Nov. 20, 1997

(30) Foreign Application Priority Data

May 13, 1996 (CH) .................................................. 1217/96

(51) Int. Cl.$^7$ .................................................. B65G 47/84
(52) U.S. Cl. .................................... 198/470.1; 198/474.1; 198/476.1
(58) Field of Search .................... 198/377.01, 377.03, 198/377.07, 577, 579, 469.1, 470.1, 474.1, 475.1, 476.1, 485.1

(56) References Cited

U.S. PATENT DOCUMENTS

| | | | |
|---|---|---|---|
| 3,590,982 | | 7/1971 | Banyas . |
| 3,901,180 | * | 8/1975 | Allen et al. ............................. 118/2 |
| 3,938,847 | * | 2/1976 | Peyton ................................. 294/110 |
| 3,944,058 | | 3/1976 | Strauss ................................. 198/179 |
| 3,951,285 | | 4/1976 | Barker ................................. 214/309 |
| 4,106,612 | * | 8/1978 | Koerner ............................... 198/479 |
| 4,199,291 | * | 4/1980 | Winiasz et al. ..................... 414/416 |
| 4,215,967 | * | 8/1980 | McGill et al. ....................... 414/416 |
| 4,262,795 | * | 4/1981 | Hecker .................................. 198/479 |
| 4,287,980 | * | 9/1981 | Monferme ............................ 198/425 |
| 4,541,524 | * | 9/1985 | McGill et al. ..................... 198/470.1 |
| 5,529,191 | * | 6/1996 | Washeim ......................... 198/370.01 |
| 5,797,249 | * | 8/1998 | Hartness ............................... 53/473 |

FOREIGN PATENT DOCUMENTS

| 195 12 515 A1 | 5/1995 | (DE) . |
|---|---|---|
| 0 005 402 | 11/1979 | (EP) . |

* cited by examiner

Primary Examiner—Christopher P. Ellis
Assistant Examiner—Khoi H. Tran
(74) Attorney, Agent, or Firm—Rankin, Hill, Porter & Clark LLP (57) ABSTRACT

The conveying method comprises a flying takeover of containers (1) being fed into a takeover area (U.1) in a container stream, hanging conveyance of the containers along a conveying path (FS) with a freely selectable course and delivery of the containers in a delivery area (U.2). For taking over the containers, a sequence of individual and equidistant holding means (5) is supplied to the takeover area (U.1) along a descending curved path (7') joining a container feeding path (8) tangentially at the end of the takeover area (U.1) and the holding means (5) are introduced into the container stream each between two containers (1). At the beginning of this introduction, the holding means have a speed (v') greater than the container speed (v) and during introduction they are decelerated to the container speed (v). Thereby, the feeding of containers and holding means is matched such that each holding means (5) reaches the container feeding speed (v) when it encircles the container downstream, i.e. when it is in an at least potential holding position relative to this container. At the latest in the delivery area, the holding means are turned by 180° around a vertical axis such that for delivery the containers to a container removing means (11), the holding means (5) can be conveyed away along an upward curved path. The curved path of the holding means in the takeover area (U.1) and/or in the delivery area (U.2) may also be realized by individual pivoting of the holding means (5).

20 Claims, 8 Drawing Sheets

METHOD FOR THE SUSPENDED CONVEYING OF CONTAINERS AND DEVICE FOR CARRYING OUT SAID METHOD

The invention is in the field of conveying techniques and concerns a conveying method according to the generic part of the first independent claim and a device for carrying out the method. The inventive method and the device for carrying it out are designed for conveying containers in a hanging position, which containers comprise a defined bottom upon which bottom they can stand individually and, opposite to the bottom an area with an opening, in particular shaped as a neck and head portion, whereby the cross section of the neck portion is smaller than the cross section of the head portion. Such containers are e.g. bottles made of plastic or glass as they are used in wholesale and retail trade for beverages and other liquid materials.

Filled and sealed bottles and similar containers according to the definition above are normally conveyed standing in an upright position. They are conveyed with on conveying means normally consisting of conveying elements. These conveying elements are e.g. moved along a conveying line with the help of a chain to which they are fixed. However, as the conveyed bottles stand individually and quite freely on such conveying lines it is impossible to integrate any slopes with a gradient worth mentioning into such conveying lines. Therefore, they are normally kept at about working height and lead through the production and filling areas substantially horizontally thus forming for people and vehicles, significant obstructions in the approach to the processing stations.

Although bottles conveyed with the aid of conveying means as mentioned above can be conveyed in line one after the other by guiding them laterally, it is hardly possible to keep them apart by a constant distance, which constitutes a further disadvantage of the conveying means. Especially when placing the bottles onto such a conveying means or when transferring them from one conveying means to a next one having a possibly different conveying speed, blocking and mutual interference of the bottles can occur.

The bottles touch and rub against each other when guided laterally as well as when blocking as mentioned above. In many cases this is a problem, particularly for bottles with stuck-on labels and even more particularly directly after the labels have been stuck on.

For preventing the disadvantages of conveying the containers standing on conveyors, other conveying methods have been developed in which the containers are conveyed, at least in parts of a conveying path, held in a hanging position by a gripper each. The grippers are arranged on a transport chain with regular distances between each other. For taking over the containers with the grippers, containers and grippers are conveyed in absolute synchronism. During this synchronous conveyance each gripper travels perpendicular to the conveying direction being lowered onto the container to be gripped (e.g. as described in U.S. Pat. No. 3,944,058) or approaching the container to be gripped from one side (e.g. as described in U.S. Pat. No. 3,590,982). At the end of the gripper travel, the gripper is in a position in which it can be closed for gripping the container.

For transferring containers from one conveying means to another one, the conveying means e.g. being linear belt conveyors and/or revolving conveyors, it is known to use revolving apparatuses equipped with grippers revolving on a substantially horizontal circle (e.g. as described in EP-0005402 or DE 19512515). The circle on which the grippers move is such arranged that it has in a taking-over and in a transfer location, a common tangent with the conveying means from which it takes the containers over and with the conveying means to which it transfers the containers. Container transfer in such a taking-over or transfer location is carried out without gripper travel as described above.

It is an object of the invention to provide a method with which containers having a defined bottom and an opening area (the opening being open or closed) substantially opposite to the bottom are taken over by individual holding means, are conveyed held in a hanging position along a conveying path having, within very wide limits a freely selectable course, and are delivered at the end of the conveying path. Taking-over of the containers by the holding means is to be flying, i.e. without interruption of the continuous conveying. Delivering the containers from the holding means is to be easily adaptable to various conditions. For the whole of the method it is to be possible independent form the course of the conveying path to maintain a container position corresponding to the standing position.

A further object of the invention is to provide a device for carrying out the method. This device is to be simple and room saving and, regarding investment and operation not more costly than the known devices as mentioned further up. Furthermore, the inventive device is to be easily adaptable to different formats of containers to be conveyed, e.g. to different sizes of bottles.

This object is achieved by the method and the device as defined in the claims.

For taking-over according to the inventive method, the containers are fed to a takeover area in form of an orientated continuous stream along a container feeding path such that they enter the takeover area at a predetermined speed and with predetermined regular distances between each other. Thereby, the containers are in a standing position and the conveying force acts on their bottom.

Furthermore, a succession of equidistant individual holding means is fed to the takeover area along a curved path joining the container feeding path tangentially at the end of the takeover area whereby the holding means are fed into the stream of containers between two containers each. At entering the takeover area, the holding means have a speed different from the container feeding speed and during feeding, their speed is decreased or increased. This means that holding means and containers are conveyed, regarding speed, asynchronously through the takeover area. Thereby, conveyance of holding means and conveyance of containers are matched to each other such that each holding means reaches the container feeding speed when it is in a position in which it encircles a container, i.e. is in an at least potential holding position relative to this container (end of takeover area).

If necessary, the containers are aligned for being fed into the takeover area and given a predetermined feeding speed, whereby the distances between the containers are at the same time equalized (container timing).

If necessary, at the end of the takeover area, parts of each holding means are moved relative to each other for securing the hold of the holding means on the container.

For conveying, the containers each held by a holding means in a hanging position are transported along a conveying path which may run in any chosen direction in space, whereby the position of the holding means is variable relative to the orientation of the conveying path such that a container position corresponding to a standing position can be maintained.

At the end of the conveying path, the containers are released by the holding means in a delivery area and holding means and containers are conveyed away with separate conveying means. For separating holding means and containers, various methods are applicable according to the design of holding means and containers. These methods will be described further below.

The method will also work for a plurality of container feeding paths running in parallel, whereby the holding means are designed for holding and conveying more than one container. It is possible also to convey more holding means than containers into the takeover area such that only each nth holding means grips a container. It is possible also to arrange a plurality of takeover areas or delivery areas along a conveying path and to feed or deliver in each takeover or delivery area a regular sequence of containers (e.g. each third container) or controlled according to demand.

The inventive device substantially comprises of the following components:

a plurality of holding means being pivotabel relative to a conveying path and a suitable transport means for conveying the holding means along a curved descending path into the takeover area, the holding means being conveyed equidistantly and with a speed which is greater or smaller than the container speed, for decreasing or increasing the speed of the holding means in the takeover area and for conveying the holding means along the conveying path and through the delivery area; e.g. a transport chain with holding means being arranged pivotally and distanced from the chain such that on a curved path they have a greater speed than the chain;

container feeding means acting on the bottom area of the containers (e.g. a band conveyor) for feeding containers into a takeover area in a substantially upright standing position along a container feeding path; e.g. a band conveyor;

if applicable, control means for controlling a relative movement between parts of holding means for bringing the holding means into a secured holding position and/or onto a specific takeover or delivery position (release position); e.g. stationary cams arranged at least in takeover and delivery areas;

if applicable, aligning means for aligning (laterally and/or vertically) the containers and timing means for setting the predetermined container distance and the predetermined container feeding speed for feeding the containers into the takeover area; e.g. a timing screw acting on the head area of the containers or driving pins acting on the bottom area of the containers in an accelerating or a decelerating manner;

if applicable, further conveying means for removing the containers from the delivery area along a container removal path; e.g. a further band conveyor.

The specific advantages of the inventive method and of the inventive device for carrying out the method are their simplicity (no travel of holding means in takeover or delivery area) and the room saving (introduction of the holding means into the container stream from above). By preventing the travel of the holding means unfavorable forces acting on the transport means (e.g. transport chain) are prevented also.

Several examples of embodiments of the inventive method and of embodiments of the inventive device are described in more detail in connection with the following Figures, wherein.

Figure 1:
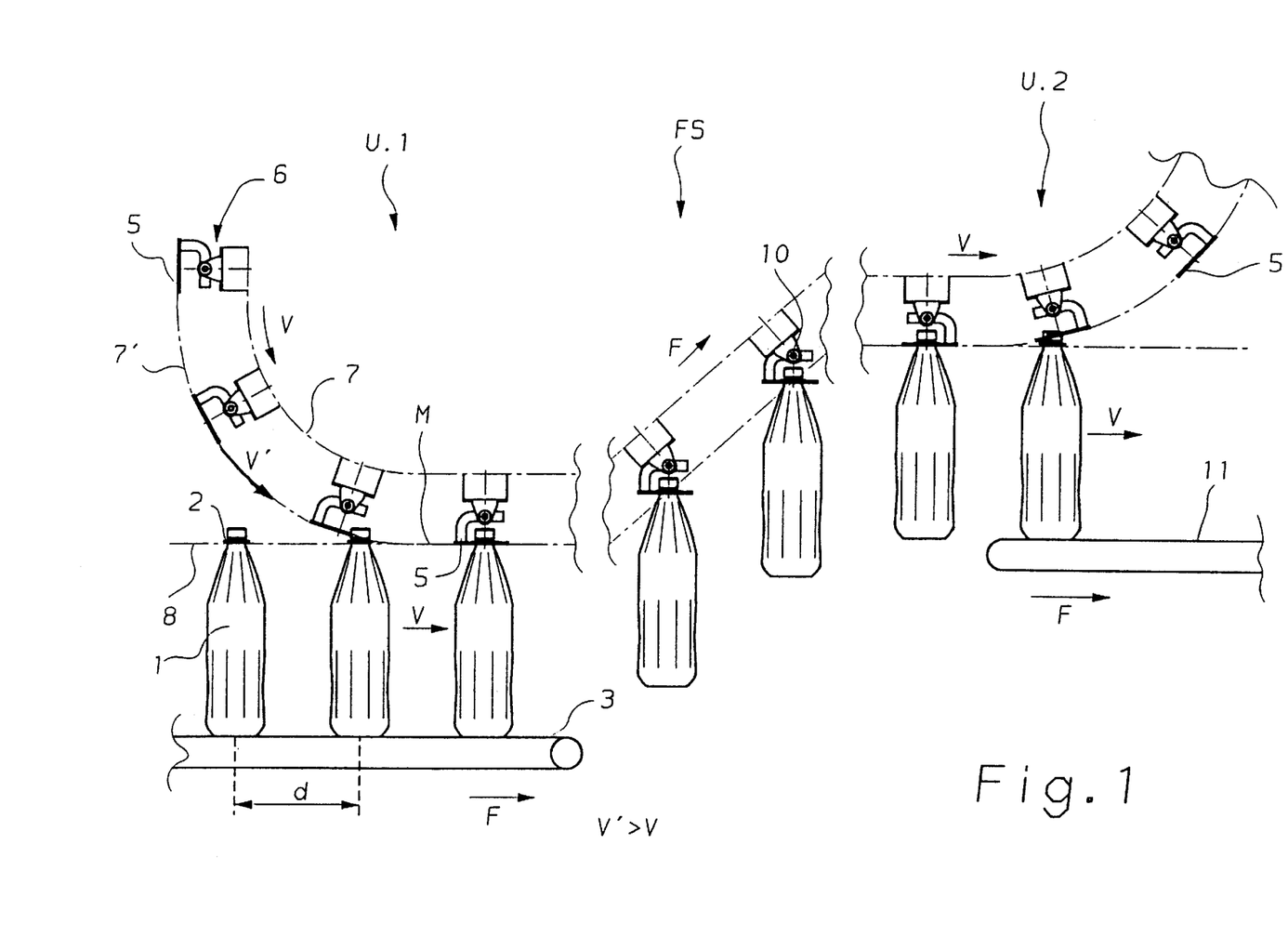
FIGS. 1 and 2 show two exemplified embodiments of the inventive method illustrated by means of a method for conveying bottles.

FIG. 1 shows for a first embodiment of the inventive method, the takeover area U.1, a short piece of the conveying path FS and the delivery area U.2. The conveying direction is denominated generally with arrows F. In the illustrated embodiment, the containers 1 to be conveyed are bottles with a collar 2 below the opening or below a closing top respectively, whereby the collar has the largest cross section of the opening area such that the bottle can be held below its collar for being conveyed in a hanging position.

The containers are conveyed e.g. by means of a band conveyor 3 into the takeover area U.1 having a container feeding speed v and distances d from each other.

The holding means 5 are connected to the transport means with connecting elements 6 and are transported by the transport means along the path 7'. The transport means is schematically illustrated by the broken line 7. The transport means is e.g. a transport chain running in a suitable guide means, the holding means 5 being arranged on the chain via connecting elements 6 such that in a curved part of the conveying path they are moved around a greater curve radius and thus have a greater speed than the transport means.

The transport means is driven with the same speed v as the belt conveyor 3, the holding means have a speed v' greater then v on the curved conveying path along which they are conveyed into the takeover area U.1. At the end of the takeover area the path 7' of the holding means joins the container feeding path tangentially, which container feeding path is substantially straight and is illustrated by a broken line 8 in a height in which the containers are gripped by the holding means. From the joining point M onward the speed of the holding means is equal v. Synchronization between container feeding and feeding of holding means is to be arranged such that at the end of the takeover area, i.e. in the joining point M of the path 7' of the holding means with the container feeding path 8, each holding means has caught up with the container downstream and encircles it in its neck region, as shown in FIG. 1 for the holding means, which has just passed the joining point M. The holding means encircles the neck region narrower than the width of the collar such that the container on leaving the feeding means 3 is conveyed away hanging on the holding means.

For enabling slopes along the conveying path FS without changing the standing position of the conveyed container, the connecting elements 6 have joints 10. For maintaining the upright position the joint is released, for other conveying, it may by blocked.

In the delivery area U.2, the containers 1 are delivered to e.g. a band conveyor for being conveyed away. The holding means 5 are conveyed away upwards. Thereby the speed of the band conveyor 11 is the same as the speed of the transport means of the holding means 5. For enabling the holding means to be conveyed away on an upward curved path, at the entrance to the delivery area U.2 or in any area between the takeover area U.1 and the delivery area U.2 the holding means are turned (e.g. around the axis of the held container) such that after turning they encircle the container from the front. The holding means is then accelerated, separated from the container and conveyed away upward in analogy to the takeover in the takeover area.

If the removal means 11 has a grater speed than the transport means of the holding means 5 it is not necessary to turn the holding means. The containers are then driven out of the encircling by the holding means before the latter are conveyed away upward.

If the holding means are to be conveyed away without turning but in an upward curved path and with the speed of the transport means of the holding means and the container removing speed being the same, the holding means need to be brought into a release position before conveying away, in which release position the holding means is able to be moved above the head portion, i.e. over the collar 2 of the container at a speed slightly higher than the container speed. Such a release position can be realized by moving parts of the holding means relative to each other (see FIGS. 5 and 6).

Figure 2:
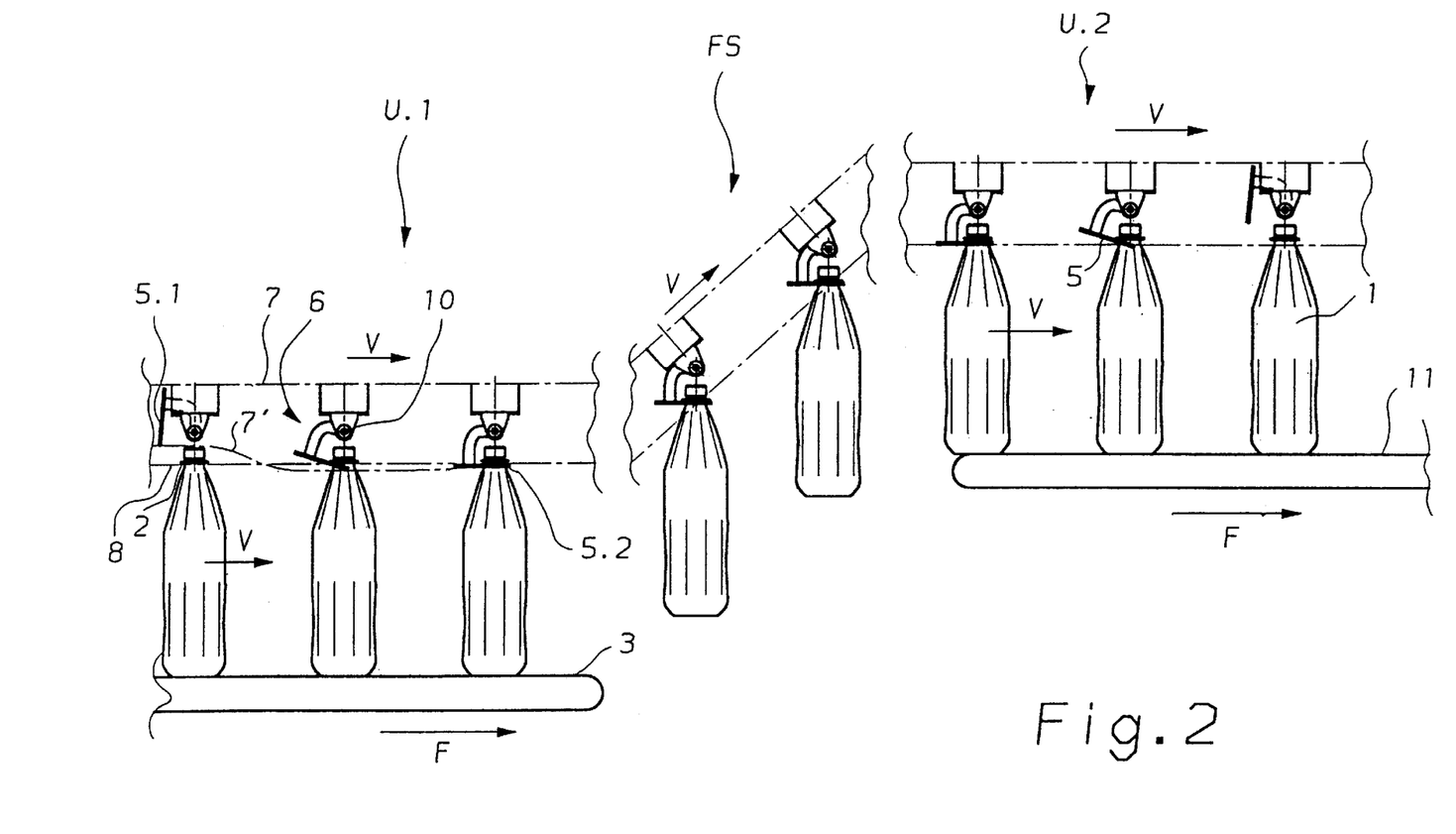

FIG. 2 shows in the same way as FIG. 1, a further exemplified embodiment of the inventive method. Same elements are designated with same reference numbers as in FIG. 1.

As in FIG. 1, the holding means 5 are conveyed into the takeover area U.1 on an descending curved path 7'. This curved path is realized by superimposing a transport means path 7 being e.g substantially parallel to the container feeding path 8, and a pivoting movement of the holding means around a pivot axis perpendicular to the conveying direction. In FIG. 2, this is the pivot axis of the joint 10 in the connecting element 6 between the holding means 5 and the transport means.

The holding means is brought from an upper position 5.1 into a lower position 5.2 by pivoting it in conveying direction. During pivoting the holding means has a speed greater than the containers and is able to catch up with the container downstream. It is obvious that for such a case the design of the holding means 5 and the path 7 of the transport means is to be adapted to the form of the containers such that the container is not disturbed by the pivoting of the holding means 5.

The takeover as shown in FIG. 2 comprises pivoting the holding means in conveying direction resulting in accelerating the holding means relative to the containers. In analogue manner it is thinkable to pivot the holding means in opposite direction to the conveying direction and such first decelerating and then accelerating the holding means and to encircle each container from the front with a downstream holding means.

In the delivery area U.2, the holding means is in analogue manner pivoted back whilst the container is conveyed away by the removing means (e.g. belt conveyor 11) with a constant speed v.

As mentioned above, the takeover methods according to FIGS. 1 and 2 may also be combined by superimposing a pivoting movement of the holding means and a holding means feeding along a curved feeding path. Comparing FIGS. 1 and 2 shows that by corresponding design of the holding means 5, the takeover area and the delivery area can be combined in different ways. Furthermore, for the embodiment according to FIG. 2 a delivery area according to FIG. 1 is applicable also. An embodiment to be realized is to be adapted in particular to the form of the containers to be conveyed, to the course of the conveying path along which the containers are to be conveyed and to the conditions given externally by the container feeding means and the container removing means.

Instead of the transport chain with equidistant holding means attached to it in an articulate manner, it is possible to use holding means attached to individual transport elements running in suitable guides and connected to each other by means of flexible connections to form a 'chain' with varying distances between the transport elements. Use of such a chain of transport elements flexibly joined to each other makes it possible to buffer the containers along the conveying path.

When using the above mentioned embodiment of holding/transport means it is necessary to provide timing means upstream of the takeover area for timing the holding means, i.e. bring them to a predetermined distance from each other and to a predetermined feeding speed v. A device for timing flexibly connected chain members is e.g described in the publication U.S. Pat. No. 4,887,809 (or EP-309702) and for this reason does not need to be described in detail here.

FIGS. 3 to 6 show two exemplified embodiments of holding means suitable to be used in the embodiments of the inventive method according to FIGS. 1 and 2.

Figure 3:
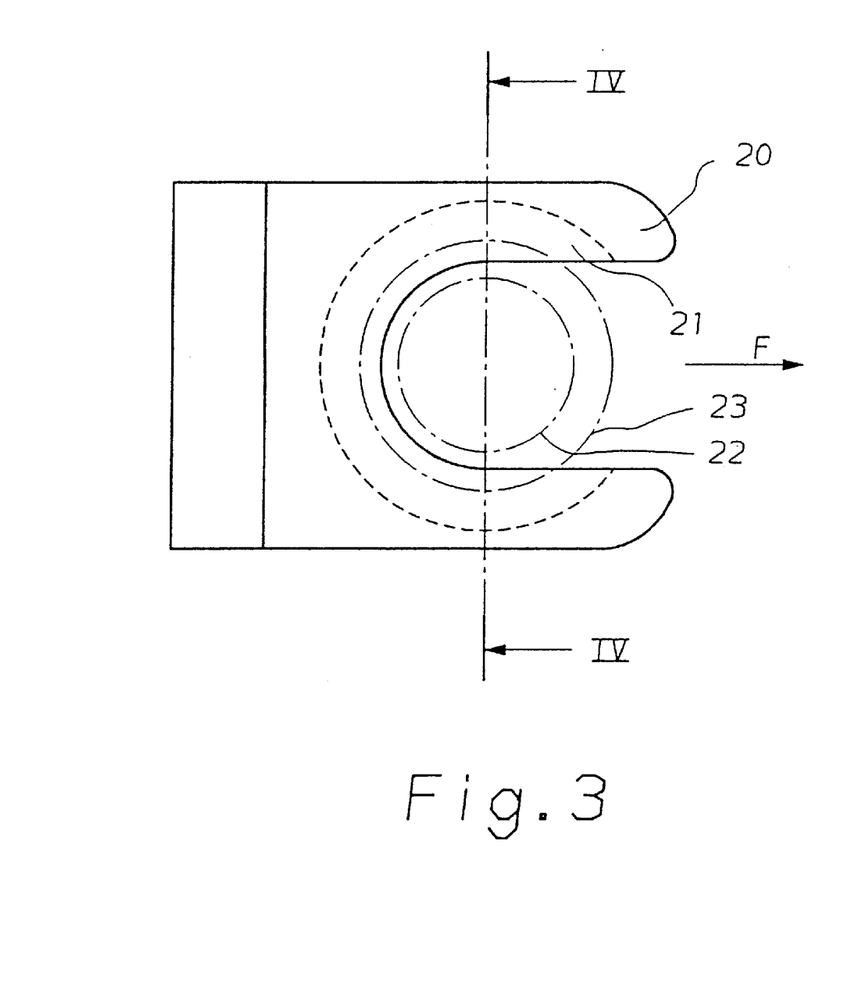
FIGS. 3 and 4 show a simple exemplified embodiment of a holding means (without connection to the transport means) viewed from below (FIG. 3) and in section (FIG. 4)
Figure 4:
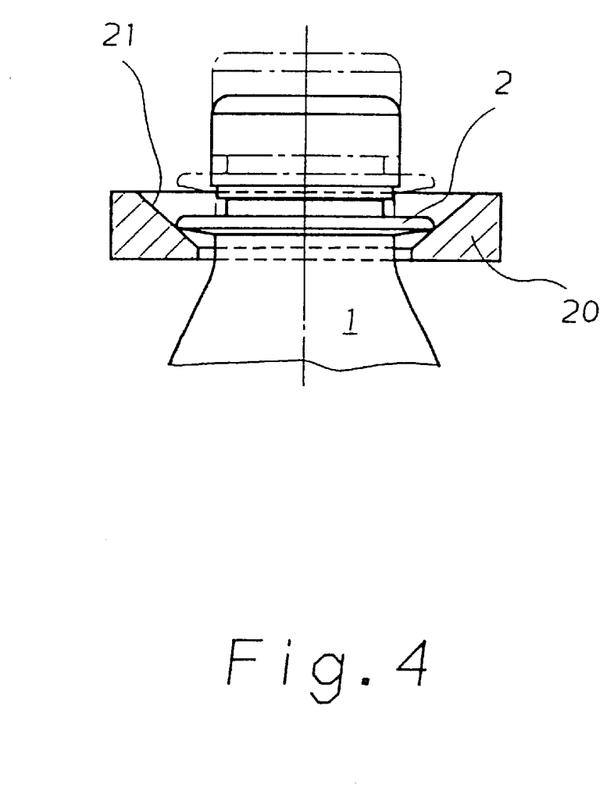

FIG. 3 and 4 show a very simple embodiment of the holding means viewed from below (FIG. 3) and in section (FIG. 4, according to section line IV—IV in FIG. 3). The holding means is a simple holding fork 20 being conveyed with its arms parallel to the conveying direction (arrow F or opposite to arrow F). The distance between the two arms of the fork is greater than the diameter of the container neck on which the container is to be held but smaller than the diameter of the container portion above the neck portion (e.g. collar diameter). In FIG. 3, neck and collar of the container are indicated with circular broken lines 22 and 23.

On the upper side of the holding fork 20, the inner edges of the fork arms are designed as parts of a hollow cone, of which the upper and larger diameter is larger than the collar diameter (circle 23) of the container to be conveyed. As seen from FIG. 4, the cone serves for securing and centering the container. On takeover, the container is encircled by the holding fork, the collar being positioned above the holding fork 20 (position of the container indicated in dash dotted lines in FIG. 4) and is lowered into the securing cone 21 by a corresponding course of the holding means and/or of the container feeding means. Containers which need not be handled with the utmost care, can simply drop into the securing cone on leaving the container feeding means. For delivery, the container is e.g. raised to its upper position (dash dotted lines) before being separated from the holding means.

The lowest part of the securing cone 21 may be designed as an elastic lip.

Figure 5:
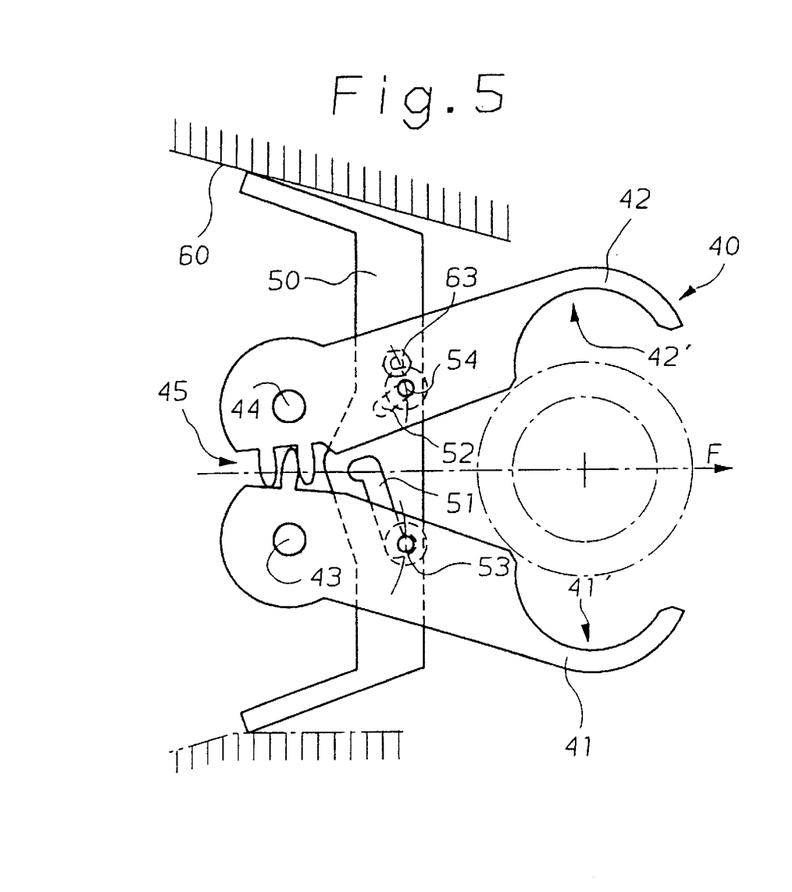
FIGS. 5 and 6 show a further exemplified embodiment of a holding means (without connection to the transport means) viewed from below in takeover/delivery position (FIG. 5) and in holding/securing position (FIG. 6)
Figure 6:
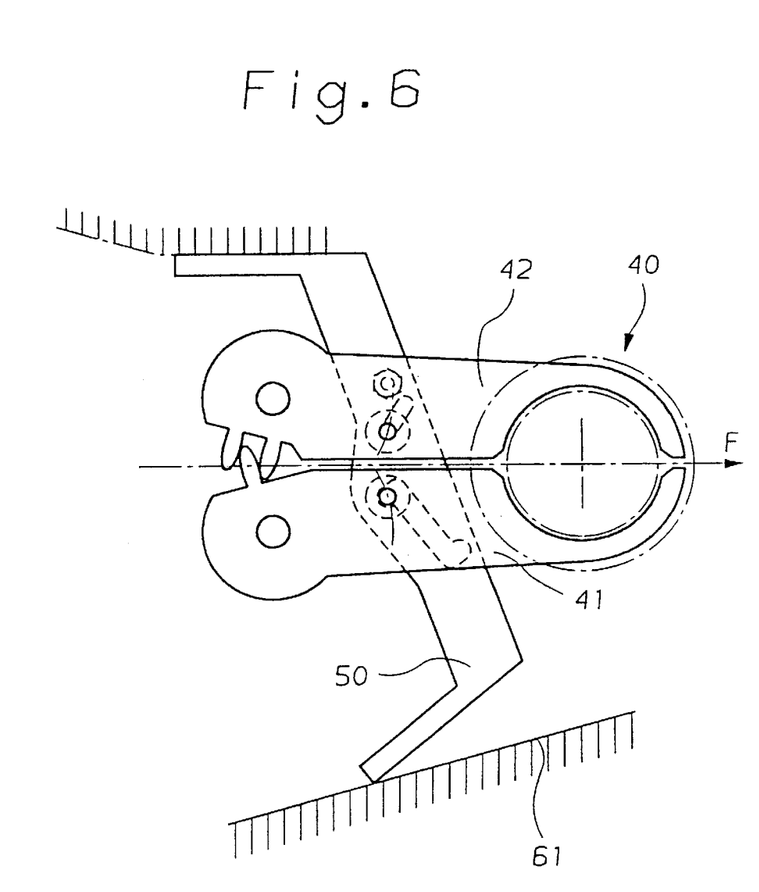

FIGS. 5 and 6 show, again viewed from below a further exemplified embodiment of the holding means. It is a holding gripper 40 with two gripper jaws 41 and 42. Through movement of the gripper jaws relative to each other the holding gripper is brought into an open position (FIG. 5: takeover position and delivery position) and into a closed position (FIG. 6: securing or conveying position). In addition to the two gripper jaws, the holding gripper comprises a control lever 50.

The gripper jaws are rotateably fixed to a connecting element connecting the gripper to a transport means (connecting element not shown) such that the two jaws can each be rotated around rotation axes 43 or 44 respectively, whereby each gripper jaw comprises a concave gripping area 41' or 42' adapted to the form of the bottle neck or collar to be gripped. Furthermore, the gripper jaws 41 and 42 comprise a tooth system 45 which is arranged such that the gripper jaws 41 and 42 are functionally coupled for at least a part of their rotation around rotation axes 43 and 44 by meshing of the teeth of the tooth system.

The control lever 50 comprises two slots 51 and 52 in each of which a pin 53 is movably located for connecting the gripper jaw 41 or 42 respectively with the control lever 50. Two extreme positions of the control lever 50 and two correspondingly extreme positions of the gripper jaws 41 and 42 are defined by the slots 51 and 52: an open position (FIG. 5) in which the control lever 50 is orientated substantially transverse to the conveying direction F and a closed position (FIG. 6) in which the control lever 50 is facing downstream on the side of the gripper jaw 41.

In order to bring the gripper into its closed position (FIG. 6) from its open position (FIG. 5) it is to be guided past a template (template area 60 in FIG. 5) on the side of the gripper jaw 42 which template delays the control lever on this side of the gripper. Thus, the control lever 50 is pivoted relative to the gripper jaws 41 and 42 and the pins 53 or 54 respectively are moved in the slots 51 or 52 respectively. From this results a rotation of the gripper jaws around rotation axis 43 or 44 respectively, which rotation is synchronized by the tooth system 45. If the gripper is to be brought into its open position from its closed position it is to be guided past a template (template area 61, FIG. 6) which delays the control lever 50 on the side of the gripper jaw 41.

In order to fix the gripper in its open or closed position respectively, there are locking means, e.g. a ball 63 which is embedded resiliently on the side of the control lever 50 facing towards the gripper jaws and for which two correspondingly located cavities (not shown) are provided in one of the gripper jaws (42).

The holding means illustrated in FIGS. 3 to 6 are exemplified embodiments designed for holding specifically formed containers. For application in connection with other containers, in particular with neckless containers, the holding means are to be adapted correspondingly. In all cases, the containers are to be held in their opening area and are to be encircled from upstream or from downstream of takeover.

Figure 7:
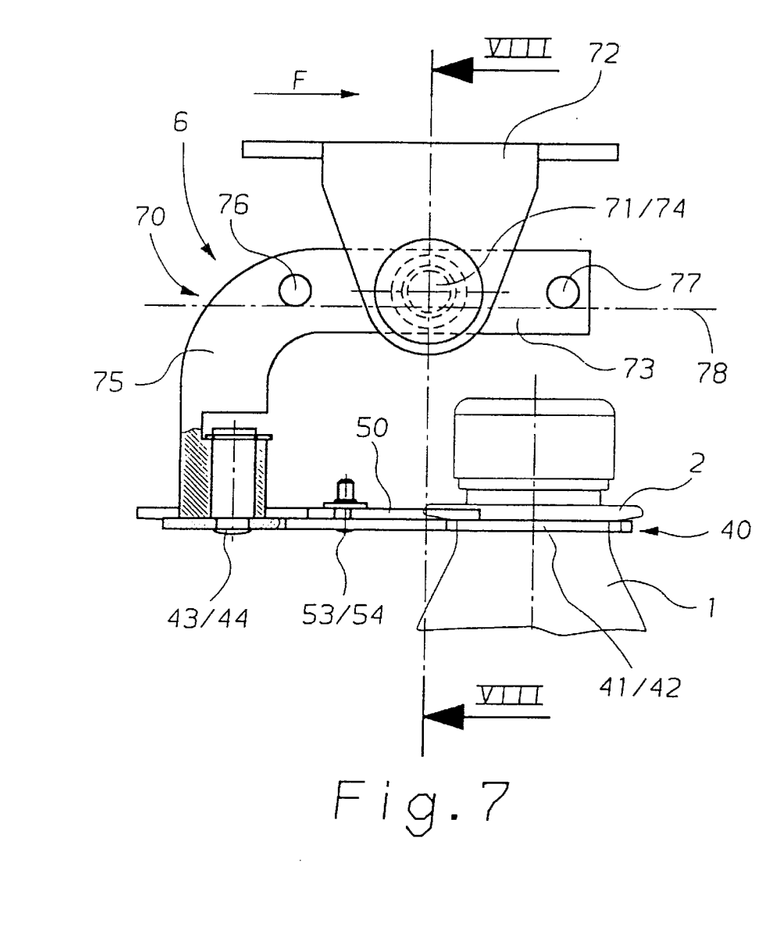
FIGS. 7 and 8 show an exemplified embodiment of an articulate connection between a holding means and a transport means viewed from the side perpendicular to the conveying direction (FIG. 7) and in section perpendicular to the conveying direction (FIG. 8)
Figure 8:
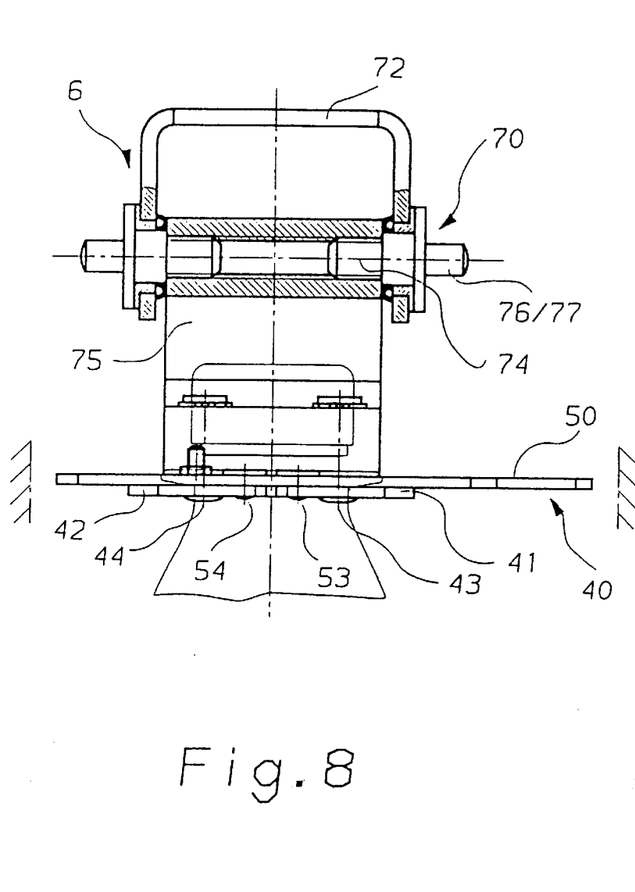

FIGS. 7 and 8 show an exemplified articulate connecting element 6 between a holding gripper 40 and a transport means viewed perpendicular to the conveying direction F (FIG. 7) and in section perpendicular to the conveying direction F (FIG. 8, section line VIII—VIII in FIG. 8). The gripper 40 is shown in connection with the connecting element as an example of a holding means. In the same way the holding fork 20 according to FIGS. 3 and 4 or another suitable holding means could be connected to the connecting element 6. The holding gripper 40 is shown in its closed position gripping the neck portion of the container 1 with the collar 2. The gripper parts previously described in connection with FIGS. 5 and 6 are denominated with the same reference numbers.

The connecting element 6 comprises a pivot part 70 and a connecting part 72 the two parts being connected in articulate manner.

The pivot part 70 comprises two arms. One arm 73 is orientated substantially parallel to the gripper jaws 41 and 42 and is joined to the connecting part 72 by pivot 74. The other arm 75 is orientated substantially perpendicular to the gripper jaws 41 and 42 and holds the gripper jaws rotateably around rotation axes 43 and 44 such that they are rotatable in a plain substantially parallel to the arm 73.

The arm 73 parallel to the gripper jaws 41 and 42 also comprises e.g. four control pins (76,77) used for controlling the pivoting movement of the pivot part 70 relative to the connecting part 72. As long as these pins are guided by a corresponding template (e.g. by a control area according to the broken line 78) the pivot part 70 is maintained in the shown pivoting position, i.e. a free pivoting movement is prevented. If there is no such template or corresponding template the pivoting movement of the pivot part 70 is free and its pivoting position is set by gravity acting on the gripped bottle and on the gripper such that the bottle 1 always hangs vertically and independent of the position of the connecting part 72 the latter being orientated substantially in the conveying direction.

Corresponding templates are used for controlling pivoting of holding means for takeover or delivery as shown in FIG. 2.

Figure 9:
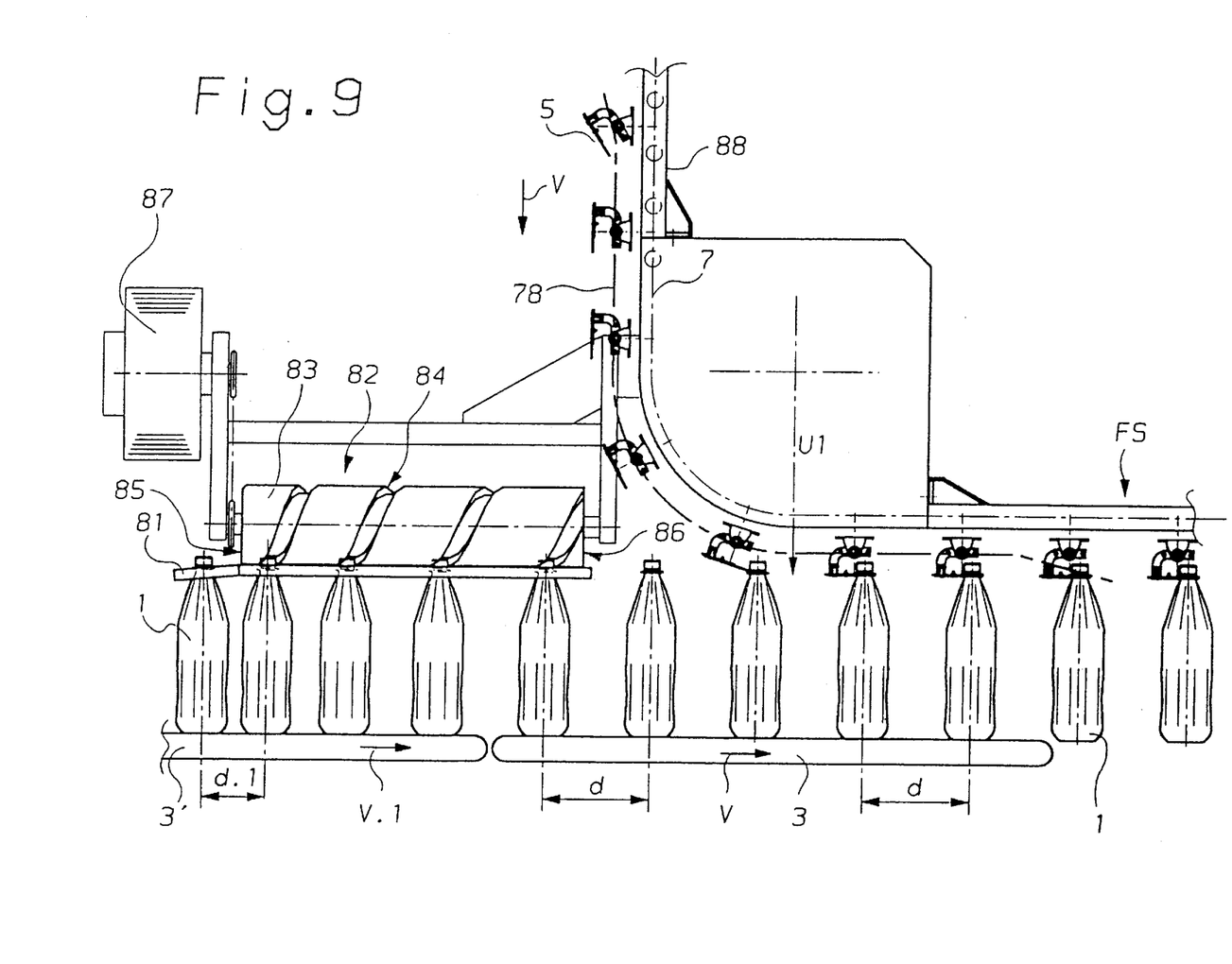
FIG. 9 shows an exemplified embodiment of the inventive device for carrying out the method according to FIG. 1 in the region of the container feeding and of the takeover (timing means, container feeding means and feeding of holding means)

FIG. 9 shows an exemplified embodiment of the device for carrying out the inventive method, in particular the feeding area of the device with supply means (3'), timing means (81/82), container feeding means (3) and gripper feeding means (5/7/88), the takeover area (U.1) of the device and the beginning of the conveying path (FS) of the device, whereby the latter correspond to the embodiment according to FIG. 1.

The containers 1—filled and sealed bottles—are supplied on a first conveying means 3' (supply means) with a predetermined conveying capacity (supply speed v.1 and distance d.1 between bottles). The bottles are lifted slightly from the conveying means 3' by a guide 81, which is arranged in the neck area of the bottles to be supplied, such that at least part of their weight is carried by the guide 81.

The guided and slightly lifted bottles are then timed and accelerated by means of a timing screw 82 comprising a groove 84 running helically around a cylindrical body 83. During timing the bottles are still being guided laterally and in height by the guide 81. The gradient of the groove 84 increases from the entrance side 85 to the exit side 86 of the timing screw 82 such that it corresponds to the distance d.1 between the supplied bottles on the entrance side 85 and to the predetermined feeding distance d between bottles 1 and between grippers 2 on the exit side 16. The timing screw 82 is driven by a drive 87 with a number of revolutions which corresponds to the timing of the bottle supply and of the bottle conveying.

The opening areas of the supplied bottles 1 are guided to the area of the timing screw 82 by the guide 81, they are positioned in the groove 84 and they are timed and accelerated by the groove. As the bottles are slightly lifted off the conveyor 3' they are still stabilized in a standing position but they can be accelerated relative to it by the timing screw 12. Before the bottles 1 reach the exit area 86 of the timing screw 82 they are taken over by a second conveyor 3 (container feeding means). The speed of this second conveyor 3 is the predetermined feeding speed v which also corresponds to the speed of the bottles which exit the groove 84 of the timing screw 82.

On this additional conveyor 3 the bottles leave the groove 84 of the timing screw 82 and enter the takeover area U.1. The holding means 6 are also conveyed into the takeover area U.1 in a manner as described in connection with FIG. 1. The transport means for the holding means is a transport chain (indicated by the dash-dotted line 7), which is guided downward in a curve of ca. 90° into the takeover area U.1 along a guide rail or guide channel 88.

The second conveyor 3 (container feeding means) ends after the actual takeover area U.1 such that it can serve as stabilizing means when holding means and bottle are brought together and during the takeover process.

From FIG. 9 it can also be seen that the holding means 5 are pivotable relative to the transport chain (uppermost holding means in a different pivoting position than the other holding means) and that all the same, for takeover the holding means are guided (template 78) such that they are not freely pivotable.

Figure 10:
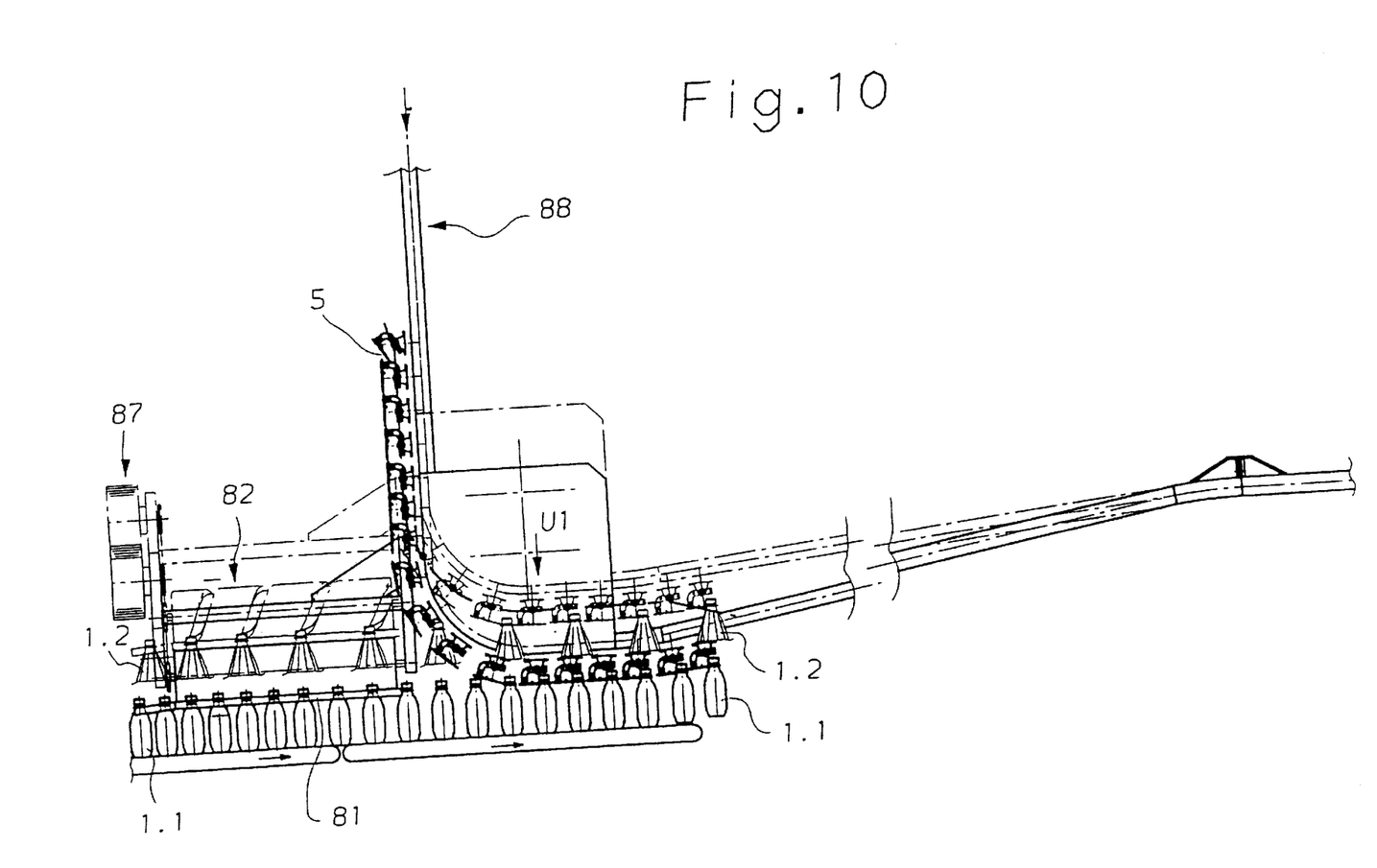
FIG. 10 shows the adjustability of the device according to FIG. 9 for conveying containers of varying height.

FIG. 10 shows the adjustability of the device according to FIG. 9 for conveyance of bottles 1.1 and 1.2 of different heights. The device is shown in unbroken lines adjusted for smaller bottles 1.1 and in broken lines adjusted for larger bottles 1.2. For simple adjustment, the timing means 81/82/87 and the guide 88 of the transport chain are connected rigidly and adjustable in height.

The small bottles 1.1 are fed into the takeover area U.1 with the same distances between each other as the holding means 5 such that each holding means takes over a bottle. The larger bottles 1.2 are fed with distances between each other which are double the size of the distances between holding means such that only every other holding means takes over a bottle. Thus, the load on the conveying device when conveying containers of different sizes can be balanced sufficiently and contact between larger containers in steep areas of the conveying path can be prevented.

For making the two feeding modes shown in FIG. 10 possible it is necessary for the timing screw to have two parallel grooves (double threaded screw) or that the timing screw is exchanged when the takeover mode is changed. In order to simplify the view, in FIG. 10 only the timing screw or groove respectively necessary for feeding the larger bottles is shown.

Figure 11:
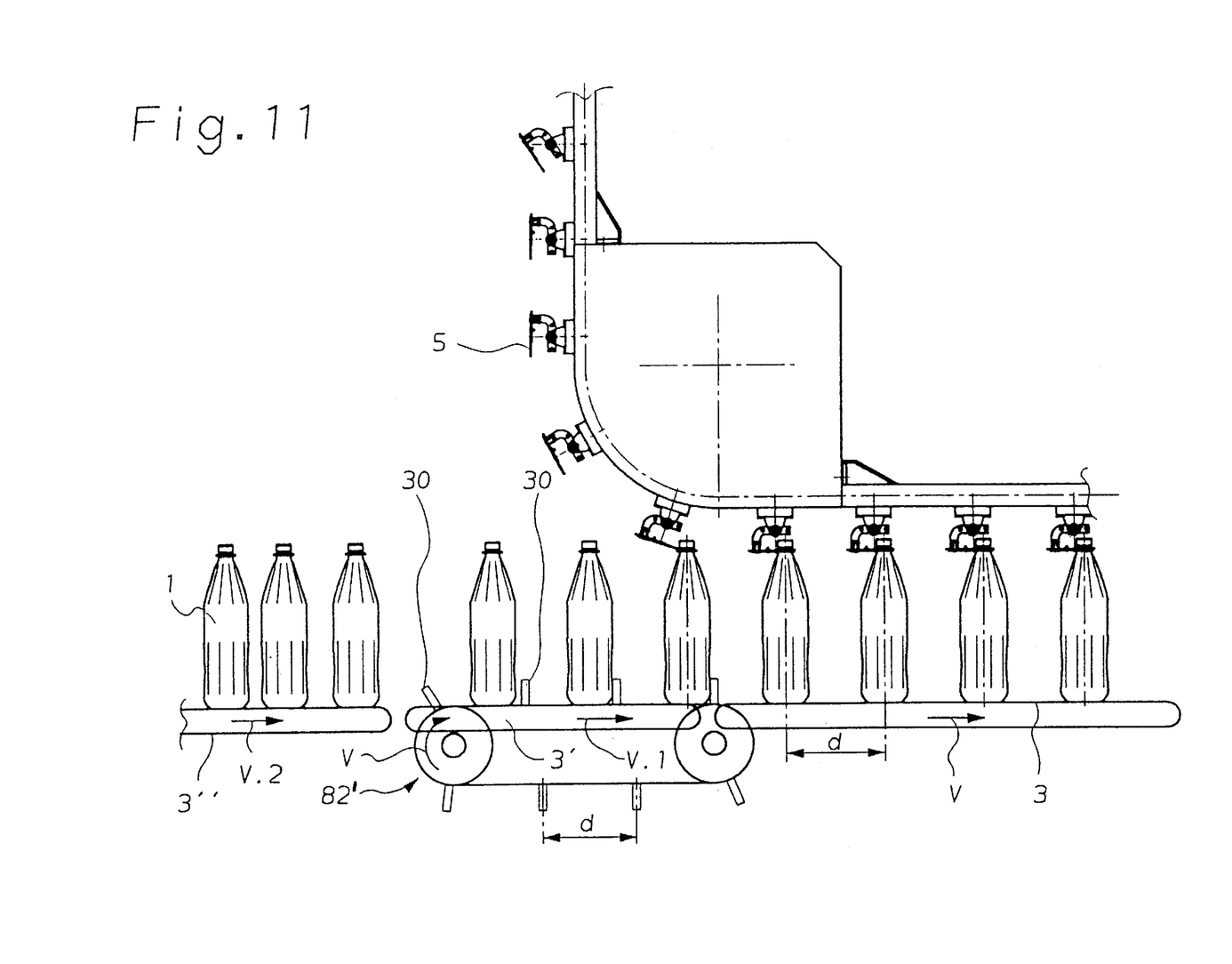
FIG. 11 shows a further exemplified embodiment of the inventive device in the feeding and takeover area.

FIG. 11 shows a further embodiment of the inventive device in the area of container 1 feeding and takeover by holding means 5. The shown embodiment substantially corresponds to the one according to FIG. 9. The difference of the two embodiments lies in the design of the timing means 82'. While the timing means according to FIG. 9 substantially consists of a timing screw and acts on the opening area of the bottles, the timing means 82' according to FIG. 11 consists of a plurality of equidistant conveying tappets 30 which e.g. reach through a gap in the first and second conveyor 3' and 3 over the conveying surface on which the bottles stand and act on the bottom area of the bottles. The timing tappets 30 are e.g. mounted on an endless transport chain at a distance d from each other which distance corresponds to the predetermined feeding distance between the bottles. The chain with the tappets is driven at a speed which corresponds to the predetermined feeding speed v. For this embodiment the supply means 3' has a speed v.1 which is higher than the feeding speed such that the timing tappets 30 run in front of the bottles and have a decelerating effect upon these.

If necessary, a further conveyor 3" can be provided upstream of the supply means 3', the further conveyor 3" being driven at a speed which is smaller than the speed of the supply means 3'.

What is claimed is:

1. A method for conveying containers (1) in a hanging position, the containers (1) having a bottom and, substantially opposite to the bottom, an opening area with an open or closed opening, wherein the containers (1) are taken over by holding means (5) in a takeover area (U.1) to which takeover area the containers (1) are fed with the aid of a conveying force acting on a bottom area of the containers (1) in a container stream having a predetermined container feeding speed (v) and a predetermined distance (d) between the containers, wherein the containers are conveyed along a conveying path (FS) in a hanging position while being held by the holding means (5) in their opening area and wherein the containers (1) are separated from the holding means (5) in a delivery area (U.2), wherein, in the takeover area (U.1), the holding means (5) are introduced into the container stream along a descending curved path (7'), wherein at the end of the takeover area (U.1) the descending curved path (7') joins a container feeding path (8) tangentially, wherein on being introduced into the container stream, the holding means at the beginning have a speed (v') different from the container feeding speed (v) and are then decelerated or accelerated to reach the container feeding speed (v) and wherein feeding of the containers (1) and of the holding means (5) into the takeover area (U.1) is such that on reaching the container feeding speed, each holding means encircles a container (1) from upstream or from downstream, wherein the holding means (5) are conveyed into the takeover area (U.1) from above and along a path (7') curved towards the container stream and the position of the holding means (5) in the takeover area relative to the curved path (7') stays substantially unchanged; and, wherein, in the delivery area (U.2), the containers are delivered to a removing means (11) acting on the bottom area of the containers (1) and the holding means (5) are conveyed away along an upward curved path and manipulated in a manner depending upon a speed of the removing means relative to a speed of the containers, such that the operation of the holding means to deliver the container to the removing means is selected from the group consisting of:

when the speed of the removing means is equal to the speed of the containers, turning the holding means about a vertical axis prior to reaching the delivery area;

when the speed of the removing means is greater than the speed of the containers, the holding means are conveyed away upward when the containers have left the encircling of the holding means; and, when the speed of the removing means is less than the speed of the containers, the holding means is conveyed away by pivoting in a direction opposite to the conveying direction.

2. Method according to claim 1, wherein the holding means (5) are freely pivotable relative to the conveying path (FS) at least during conveying along the conveying path (FS) in conveying direction (F).

3. Method according to claim 1, wherein the conveying means (5) are brought into a securing position on or after takeover of a container (1).

4. Method according to claim 1, wherein the containers (1) are brought into a secured position on or after being taken over by holding means (5) with the aid of a relative move between holding means (5) and container (1).

5. A method for conveying containers (1) in a hanging position, the containers (1) having a bottom and, substantially opposite to the bottom, an opening area with an open or closed opening, wherein the containers (1) are taken over by holding means (5) in a takeover area (U.1) to which takeover area the containers (1) are fed with the aid of a conveying force acting on the bottom area of the containers (1) in a container stream having a predetermined container feeding speed (v) and a predetermined distance (d) between the containers, wherein the containers are conveyed along a conveying path (FS) held by the holding means (5) in their opening area and wherein the containers (1) are separated from the holding means (5) in a delivery area (U.2), characterized in that in the takeover area (U.1), the holding means (5) are introduced into the container stream along a descending curved path (7'), wherein at the end of the takeover area (U.1) the descending curved path (7') loins a container feeding path (8) tangentially, wherein on being introduced into the container stream, the holding means at the beginning have a speed (v') different from the container feeding speed (v) and are then decelerated or accelerated to reach the container feeding speed (v) and wherein feeding of the containers (1) and of the holding means (5) into the takeover area (U.1) is such that on reaching the container feeding speed, each holding means encircles a container (1) from upstream or from downstream, the holding means (5) are conveyed into the takeover area (U.1) from above and along a path (7') curved towards the container stream or on a path substantially parallel to the container stream and, in the takeover area (U.1), each holding means (5) is pivoted individually; and, wherein, in a delivery area (U.2), the containers are delivered to a removing means (11) acting on the bottom area of the containers (1) and the holding means (5) are conveyed away along an upward curved path in a manner depending upon a speed of the removing means relative to a speed of the containers, such that operation of the holding means to deliver the container to the removing means is selected from the group consisting of:

when the speed of the removing means is equal to the speed of the containers, turning the holding means about a vertical axis prior to reaching the delivery area;

when the speed of the removing means is greater than the speed of the containers, the holding means are conveyed away upward when the containers have left the encircling of the holding means; and, when the speed of the removing means is less than the speed of the containers, the holding means is conveyed away by pivoting in a direction opposite to the conveying direction.

6. Method according to claim 5, characterized, in that the containers (1) are timed before being fed into the takeover area (U.1) whereby the containers are brought from a supply speed (v') to the container feeding speed (v) and whereby the distances between 30 the containers are equalized simultaneously.

7. Method according to claim 5, characterized, in that on being timed, the containers (1) are accelerated by a force acting in the opening area of the container or are decelerated by a force acting in the area of the container bottom.

8. A device comprising a plurality of holding means (5) and a transport means for conveying the holding means (5) equidistantly along a predetermined path (7') through a takeover area (U.1) then along a conveying path (FS) to a delivery area (U.2) and away from the delivery area (U.2), the device further comprising a container feeding means (3) acting on the bottom area of the containers (1) for conveying the containers (1) along a container feeding path (8) through the takeover area (U.1), wherein the predetermined path (7') on which the holding means (5) are conveyable through the takeover area (U.1) is curved and descending towards the container feeding path (8) and joins the container feeding path (8) at the end of the takeover area (U.1) tangentially, and wherein, on being conveyed along the curved path (7'), the holding means (5) are distanced from the transport means radially or are pivotable relative to the transport means in conveying direction or opposite to the conveying direction in a controlled manner and in that the transport means and the container feeding means (3) are driveable at the same speed and wherein the holding means are adapted to deliver the containers to a removing means (11) in the delivery area (U.2) in a controlled manner, operation of the holding means at the delivery area corresponding to a relative speed of the container as compared to a speed of the removing means, such that the structure of the device is selected from the group consisting of:

when the speed of the removing means is equal to the speed of the containers, the holding means is adapted to be turned around a vertical axis prior to reaching the delivery area;

when the speed of the removing means is greater than the speed of the containers, the holding means is adapted to be conveyed away upward when the containers have left the encircling of the holding means; and, when the speed of the removing means is less than the speed of the containers, the holding means is adapted to be conveyed away by pivoting in a direction opposite to the conveying direction.

9. Device according to claim 8, wherein the transport means is a transport chain.

10. Device according to claim 8, wherein the transport means comprises a plurality of transport elements each of which is movable independent of other transport elements.

11. Device according to claim 10, wherein the holding means (5) are two armed forks (20) arranged on the transport means with the aid of articulate connecting elements (6).

12. Device according to claim 10, wherein the holding means (5) are holding grippers (40) comprising gripper jaws (41/42) moveable towards each other and that at least in the takeover area and in the delivery area, control means for changing the relative position of the gripper jaws are provided.

13. Device according to claim 8, further comprising timing means (81/82, 82') arranged upstream of the takeover area (U.1) for setting the predetermined distances (d) between the containers and the predetermined container feeding speed (v) for feeding the containers (1) into the takeover area (U.1).

14. Device according to claim 13, wherein the timing means comprises a timing screw (82) acting on the opening areas of the containers (1) and a guide (81), whereby the timing screw has a groove (84) with a slope increasing from an entrance area (85) to an exit area (86).

15. Device according to claim 13 wherein the timing means (82') comprises a plurality of timing tappets (30) acting in the area of the container bottom, said tappets (30) being arranged equidistantly on an endless chain.

16. Holding means (5) with connecting element (6) being part of a device according to claim 15 wherein the connecting element (6) comprises a joint (71) and wherein, for encircling a container to be conveyed, the holding means (5) comprises two arms being arranged substantially perpendicular to the connecting element (6).

17. Holding means with connecting element according to claim 16, wherein inner edges of the arms are designed as securing cone (21).

18. Holding means with connecting element according to claim 16, wherein the holding means (5) is a holding gripper (40) having two gripper jaws (41/42) which are movable relative to each other, wherein the gripper jaws are arranged rotatably on the connecting element (6) and wherein for synchronizing gripper jaw rotation, a synchronizing means is provided.

19. Holding means with connecting element according to claim 18, wherein the holding gripper comprises a control lever (50) being connected to the gripper jaws (41, 42) by means of bolts (53, 54) movable in of slots (51, 52), which control lever protrudes the gripper jaws in conveying direction.

20. Holding means with connecting element according to claim 19, wherein the synchronizing means is a tooth system (45).

* * * * *